June 23, 1970     J. T. GILDERSLEEVE     3,516,217
COMPRESSION PACKAGING

Filed March 7, 1968     5 Sheets-Sheet 1

John T. Gildersleeve, Inventor
Koenig, Senniger,
Powers and Leavitt,
Attorneys.

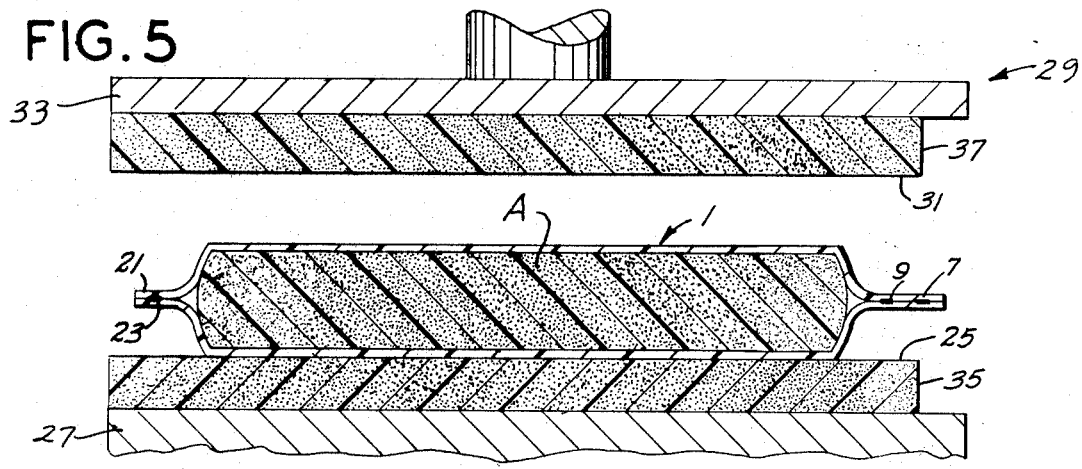
FIG. 5
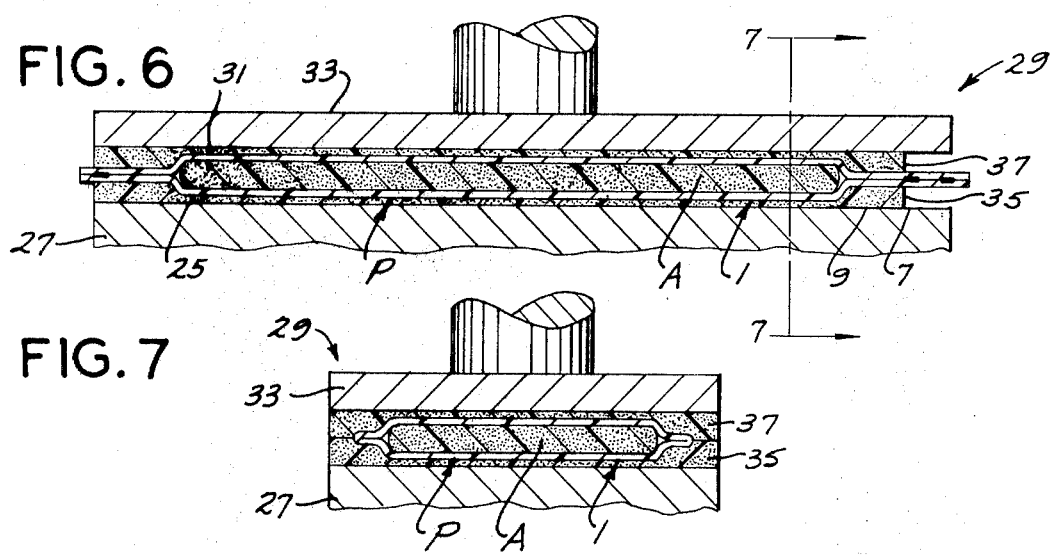
FIG. 6
FIG. 7
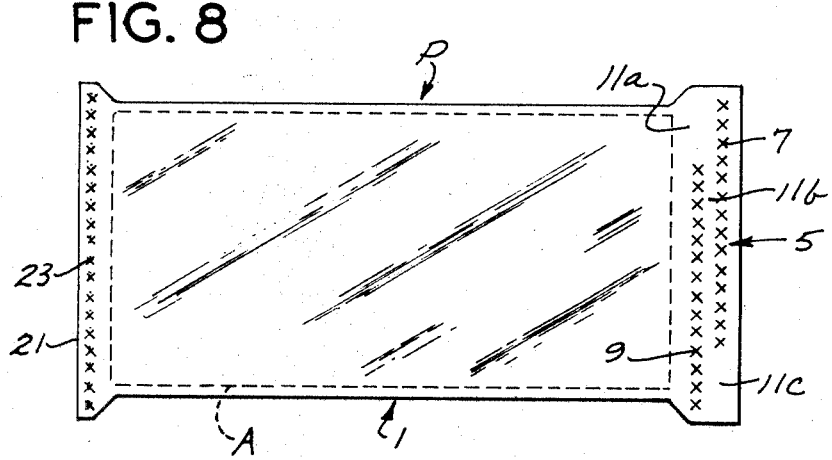
FIG. 8

June 23, 1970 J. T. GILDERSLEEVE 3,516,217
COMPRESSION PACKAGING
Filed March 7, 1968 5 Sheets-Sheet 3

United States Patent Office 3,516,217
Patented June 23, 1970

3,516,217
COMPRESSION PACKAGING
John T. Gildersleeve, Minneapolis, Minn., assignor to Bemis Company, Inc., Minneapolis, Minn., a corporation of Missouri
Filed Mar. 7, 1968, Ser. No. 711,356
Int. Cl. B65b 1/24, 61/24; B31b 49/04
U.S. Cl. 53—24                                   7 Claims

ABSTRACT OF THE DISCLOSURE

Compression packaging of compressible products, such as foamed plastic articles, pillows, cushions, blankets, towels, etc., by inserting a compressible product or products to be packaged in a plastic bag having a self-sealing vent for escape of air from the bag, sealing the bag, and squeezing the bag with the product sealed therein to compress the product, with attendant expulsion of air via the vent. The resultant compressed package or a plurality of compressed packages may be bound to prevent expansion such as would otherwise occur on re-entry of air. A bound compressed package may even be deliberately punctured for re-entry of air to cause limited expansion thereof within its binding for a tight fit.

BACKGROUND OF THE INVENTION

The invention relates to the compression packaging of various compressible products, such as pillows, cushions, foam plastic or rubber products in general, compressible textile products such as blankets and towels, etc. Generally, it encompasses the compression packaging of products as to which a substantial volume thereof, when the product is uncompressed, is simply air space, and as to which the volume of the product may be substantially reduced by encompressing it with attendant expulsion of air from the product. A typical example of such a product would be a foam rubber pillow.

Heretofore, one mode of compression packaging has involved the sealing of the product to be packaged in an air-impermeable container, which may be made of plastic, and the evacuation of air from the container by means of a vacuum pump connected to a valved nipple on the container, as shown, for example, in U.S. Pat. 2,764,859. This presents a number of problems, including the problem of complexity of the equipment needed to evacuate the container, the problem that it relies on atmospheric pressure for compression, with the result that the package is under equal compression in all directions and therefore tends to take the shape of a sphere, and the problem that many packaging applications require special material selection and package design in order to retain hermetic integrity of the compressed package throughout the packaged life of the product.

Another mode of compression packaging has involved the compression of the product prior to insertion into a container, such as a bag, which is slightly larger than the compressed product. This involves difficulties in holding the product under compression during insertion and in that, if the container is broken (accidentally or deliberately), the product is freed to expand and no longer fits in the container. This has been particularly discouraging where the product is intended for a retail outlet, noting that once a product is removed from its container in a retail outlet by a customer seeking to feel the merchandise, it cannot be readily returned to the same container.

Another contemplated mode of compression packaging, appearing in U.S. Pat. 2,496,609, has invloved the insertion of the uncompressed product in a bag through the bag mouth, the compression of the unsealed bag with attendant expulsion of air through the mouth of the bag, and, finally, the sealing of the mouth of the bag. This presents a serious problem in that, on compression of the unsealed bag with the product therein, it is extremely difficult, if not practically impossible, to make the portions of the walls at the bag mouth lie flat against one another so that a hermetic seal may be made at the mouth. Compression as shown in U.S. Pat. 2,496,609 almost invariably results in rumpling of the mouth end of the bag with the attendant impossibility of making a hermetic seal, and no practical way of eliminating this rumpling has been found. Moreover, this procedure involves the necessity for provision of a heat sealer in direct association with the compressing device.

SUMMARY OF THE INVENTION

Among the several objects of this inevntion may be noted the provision of a method of compression packaging which is considerably simplified as regards prior methods, particularly the above-described vacuum method, which produces at a rapid rate and relatively low cost a compressed package desirably having the general shape of a rectangular parallelepiped; the provision of such a method attaining compressed packages which are adapted to remain in compressed condition despite re-entry of air; and the provision of such a method wherein a compressed package or plurality of compressed packages are bound and have a tight fit in their binding.

Generally, the invention involves utilization of a bag made of material, e.g., polyethylene, which is substantially impervious to air and which has a vent for escape of air from the bag. The product is sealed in the bag, as by inserting it in the bag via a mouth at one end of the bag and sealing the mouth. The sealed bag with the product therein is then compressed between opposed pressure-applying surfaces to reduce the volume of the product, air compressed within the bag escaping via the vent, the vent then being closed against return of air to the bag thereby to form the bag with the product therein into a compressed package. Recognizing that air may ultimately re-enter a package, due to slow permeation of air through the bag material, or through the vent, or physical damage to the bag resulting in admission of air to the bag, the invention further contemplates the binding of a compressed package or a plurality of compressed packages against expansion by re-entering air, and, in certain cases, the deliberate opening of the bag by puncturing or otherwise for admission of air to cause it to tend to expand within its binding for a snug fit therein. Other objects and features will be in part apparent and in part pointed out hereinafter.

BRIEF DESCRIPTION OF THE DRAWINGS

FIG. 5 is a view showing a sealed bag with a product therein in a press for compression thereof;

FIG. 6 shows the sealed bag with the product therein compressed in the press;

FIG. 7 is a section on line 7—7 of FIG. 6;

FIG. 8 is a view of a completed compressed package;

Corresponding reference characters indicate corresponding parts throughout the several views of the drawings.

DESCRIPTION OF THE PREFERRED EMBODIMENTS

Figure 1:
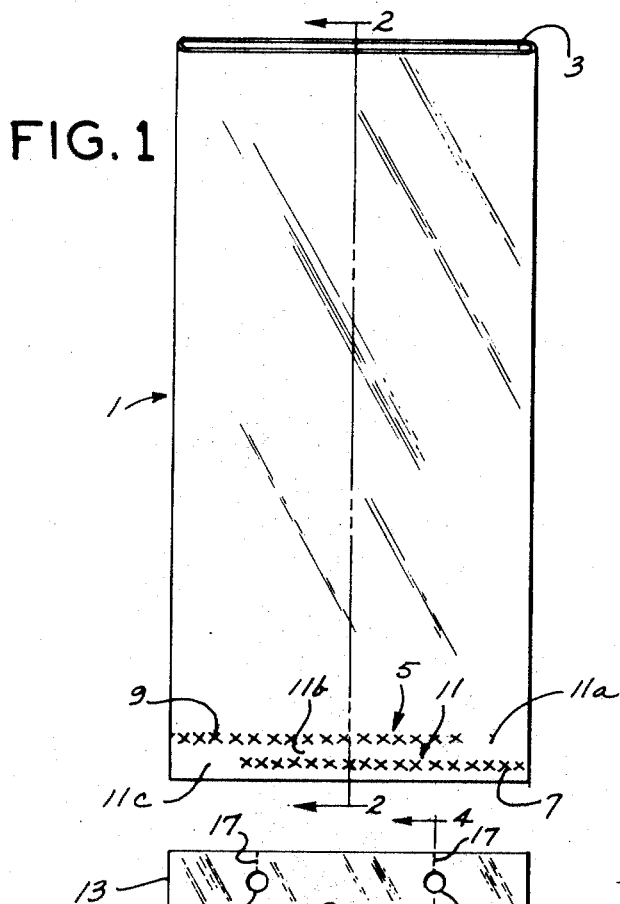
FIG. 1 is a view in elevation of a bag such as may be used in carrying out the present invention.

Referring to FIG. 1 of the drawings, there is indicated at 1 a bag such as may be used in the compression packaging of products in accordance with this invention. This bag is made of a material which is substantially impervious to air, has an open mouth 3 at one end, and a self-sealing vent 5 at its other end. More particularly, the bag is made of flexible heat-sealable sheet plastic material such as polyethylene, which is substantially impervious to air. Other flexible heat-sealable sheet plastic material may be used. The bag 1 may be made from seamless polyethylene tubing, or from polyethylene tubing made by longitudinally folding a web and forming a longitudinal tube seam, or may be one having seams at both sides.

The self-sealing vent 5 is shown as being provided by heat-sealing the walls of the bag together adjacent its end opposite the mouth in a pattern such as to provide a channel for escape of air from within the bag on compression of the bag after insertion of a product therein through the mouth and sealing of the mouth (as will appear) with resultant compression of air within the sealed bag, with this channel closing upon release of the compression to preclude re-entry of air to the bag through the channel. More particularly, this pattern comprises a first heat seal 7 adjacent the end of the bag opposite its mouth end extending transversely across the bag from one side thereof (its right side as shown in FIG. 1) toward but terminating short of its other side (its left side as shown in FIG. 1), and a second heat seal 9 spaced inward from seal 7 extending parallel to seal 7 from said other side (its left side) toward but terminating short of its said one side (its right side). This provides a channel 11 for escape of air from within the bag having an entrance at 11a constituted by the gap between the right end of seal 9 and the right side of the bag, a transverse reach 11b across the bag, and an exit 11c constituted by the gap between the left end of seal 7 and the left side of the bag.

Figure 2:
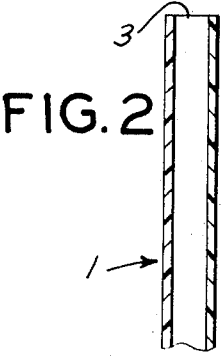
FIG. 2 is an enlarged section on line 2—2 of FIG. 1, with parts broken away and thickness exaggerated.

When a compressible product has been inserted in the bag through the mouth 3, the mouth sealed, and the bag with the product therein subjected to compression, thereby compressing air within the bag, this compressed air enters channel 11 via entrance gap 11a, puffs out the portions of the walls of the bag between seals 7 and 9 as indicated in exaggerated fashion in FIG. 2 (meaning that the transverse reach 11b of the channel is distended), and exits via the exit gap 11c. It will be observed that this exit gap 11c is at the end of the bag opposite the mouth. On completion of compression and exit of air from within the bag, external air pressure flattens the channel to preclude return of air to the bag via the channel. Seals 7 and 9 are preferably spaced from about one to four inches apart (depending on the size of the bag) for enabling fast expulsion of air from within the bag.

Figure 3:
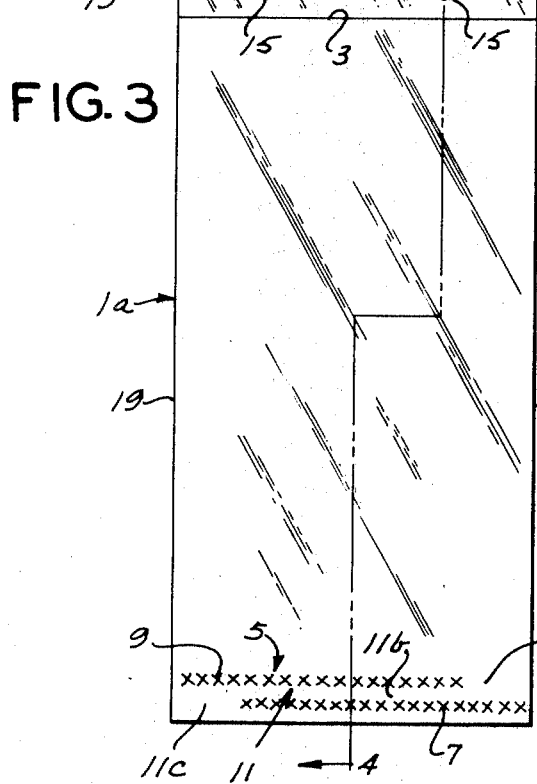
FIG. 3 is a view in elevation of another type of bag such as may be used in carrying out the invention.
Figure 4:
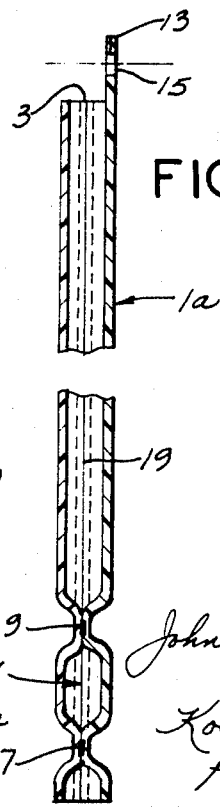
FIG. 4 is an enlarged section on line 4—4 of FIG. 3, with parts broken away and thickness exaggerated.

FIGS. 3 and 4 show a modification 1a of the FIG. 1 bag in which one of the walls of the bag, the back wall as illustrated in FIG. 3, has an extension or lip 13 at its mouth end beyond the other wall (the front wall). This lip is provided with two holes 15. The purpose for this is to enable a plurality of bags to be stacked and held in stacked assembly by suitable fastening means, such as pins or a wicket, extending through the holes. Lines of weakness, such as perforations 17, may be provided extending from the holes 15 to the end edge of the lip for facilitating tearing the bags off the pins or wicket. The holes and lines of weakness may be omitted, and a stack of bags may be unitized by stapling the lips 13 together, possibly also to a cardboard backing. Bags 1a would be made with side seams 19 using a conventional side seamed bag making machine, equipped with sealers for making the vent seals 7 and 9.

In accordance with this invention, a compressible product to be packaged, for example a foam rubber pillow A (see FIG. 5), is inserted in its initial uncompressed condition into a bag 1 (or 1a) via the open mouth 3 of the bag. The bag is dimensioned readily to receive the uncompressed product, that is, its girth corresponds to the girth of the uncompressed product and its length (from its mouth end to seal 9) is greater than the length of the uncompressed product. A mouth end portion 21 of the bag (see FIG. 5) extends beyond the adjacent end of the product, and this is sealed by forming a heat seal 23 extending completely across the bag. With the uncompressed product in the bag, the mouth end of the bag is nicely spread flat so that it is easy to make a hermetic mouth seal at 23, as distinguished from the difficulty in making a hermetic mouth seal after compression. This mouth sealing may be accomplished, for example, by use of a conventional band sealer. Incidentally, insertion of the uncompressed product in the bag is facilitated, even though the uncompressed product may have a tight fit in the bag, by reason of the fact that air compressed in the bag on insertion of the product may readily escape from the end of the bag opposite the mouth via the vent 5.

As shown in FIG. 5, the sealed bag with the uncompressed product therein is placed on the upper surface 25 of the bed 27 of a press 29 and under the lower surface 31 of the movable upper platen 33 of the press, with seal 23 and seals 7 and 9 horizontal (i.e., parallel to these pressure-applying surfaces), for flatwise compression of the package only in face-to-face direction as regards the bag (i.e., compression only in the direction across the bag faces perpendicular to the plane of seals 23, 7 and 9). The pressure-applying surfaces 25 and 31 are preferably resilient yielding surfaces, as by providing resilient foam rubber or plastic padding 35 and 37 on the bed 27 and the platen 33. The sealed bag is preferably positioned with its end having the vent extending out beyond this padding for free escape of air from the bag.

The upper platen 33 of the press is then driven downward (as by the usual air cylinder or other platen-driving means of the press) so that the sealed bag with the product A therein is compressed flatwise between surfaces 25 and 31, the latter yielding under the applied pressure as clearly illustrated in FIGS. 6 and 7 where they contact the bag for forcing the bag into conformance with the compressed product. Air compressed within the bag escapes relatively freely via the vent 5, thus enabling compression of the product. The pressure-applying bed and platen surfaces are parallel and remain generally parallel in the course of their relative movement toward and away from one another. The platen is then raised for removal of the resultant compressed package P, which then appears as shown in FIG. 8. The vent 5 automatically closes to preclude re-entry of air to the bag, so that the package remains in its compressed or flattened condition shown in FIGS. 6–8.

Figure 9:
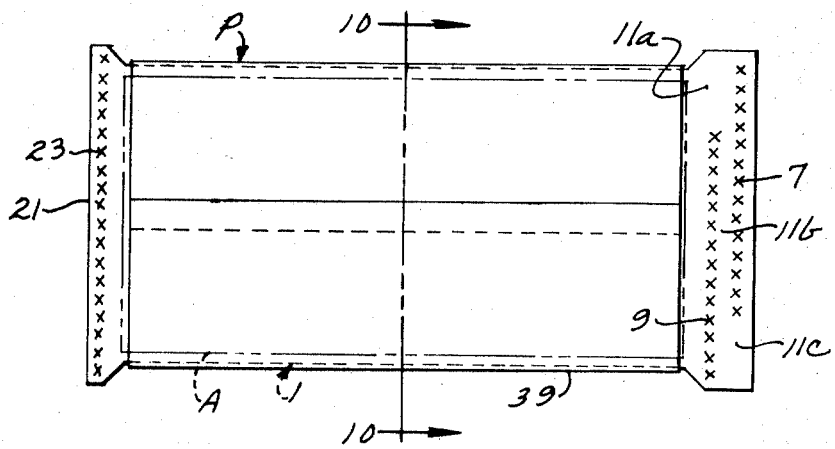
FIG. 9 is a view similar to FIG. 8 showing the compressed package bound by a band around the package.
Figure 10:
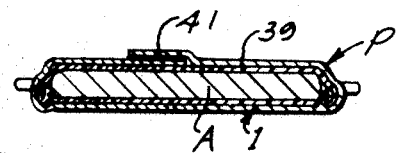
FIG. 10 is a section on line 10—10 of FIG. 9.

Recognizing that air may ultimately re-enter the package, due either to slow permeation of air through the bag material, or physical damage to the bag resulting in admission of air to the bag or leakage into the bag via vent 5, the invention further involves the binding of a compressed package P or a plurality of compressed packages against expansion by re-entering air. FIGS. 9 and 10 show one version of this involving the provision of a wrapper or band 39 extending girthwise around the compressed package. This band may consist simply of a length of paper, of suitable tensile strength, wrapped around the package and having its ends lapped and adhered together, using a glue of suitable strength, as indicated at 41. Preferably, the band extends from near one end of the package to near its other end. The band confines the compressed package against expansion such as would otherwise occur due to slow permeation of air through the bag material, physical damage to the bag resulting in admission of air, or leakage of air into the bag via vent 5. It is contemplated that, after banding, the bag of the package may be deliberately punctured or otherwise opened for admission of air to cause it to tend to expand within the band for a snug fit of the package in the band, the latter, however, confining the package against expansion until the band is removed. A snug fit is often desirable to minimize damage to the binding, particularly when paper is used therefor, and to provide a package which is more easily handled and more readily stackable.

Figure 11:
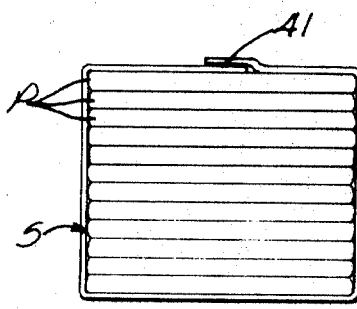
FIG. 11 is a view showing a stack of compressed packages bound by a band.
Figure 12:
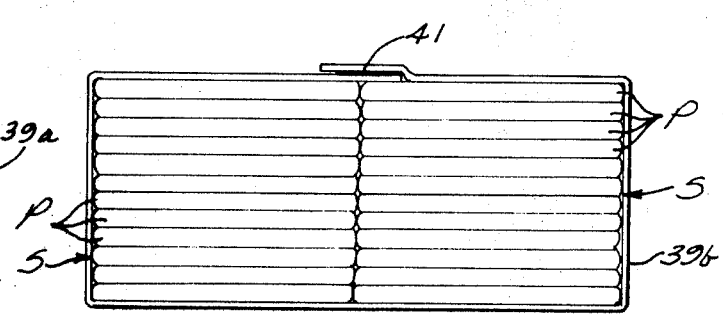
FIG. 12 is a view showing two stacks of compressed packages bound by a band.

FIG. 11 shows another version of enwrapping or binding, involving the stacking of a plurality of the compressed packages P, and the application of a band 39a (corresponding to band 39) around the stack, which is denoted S. A plurality of stacks S may be bound by one band 39b as shown in FIG. 12. One or more of the packages in the stack or stacks may be punctured or otherwise opened for deliberate admission of air thereto for a snug fit of the stack or stacks in the band.

Figures 13, 14, 15:
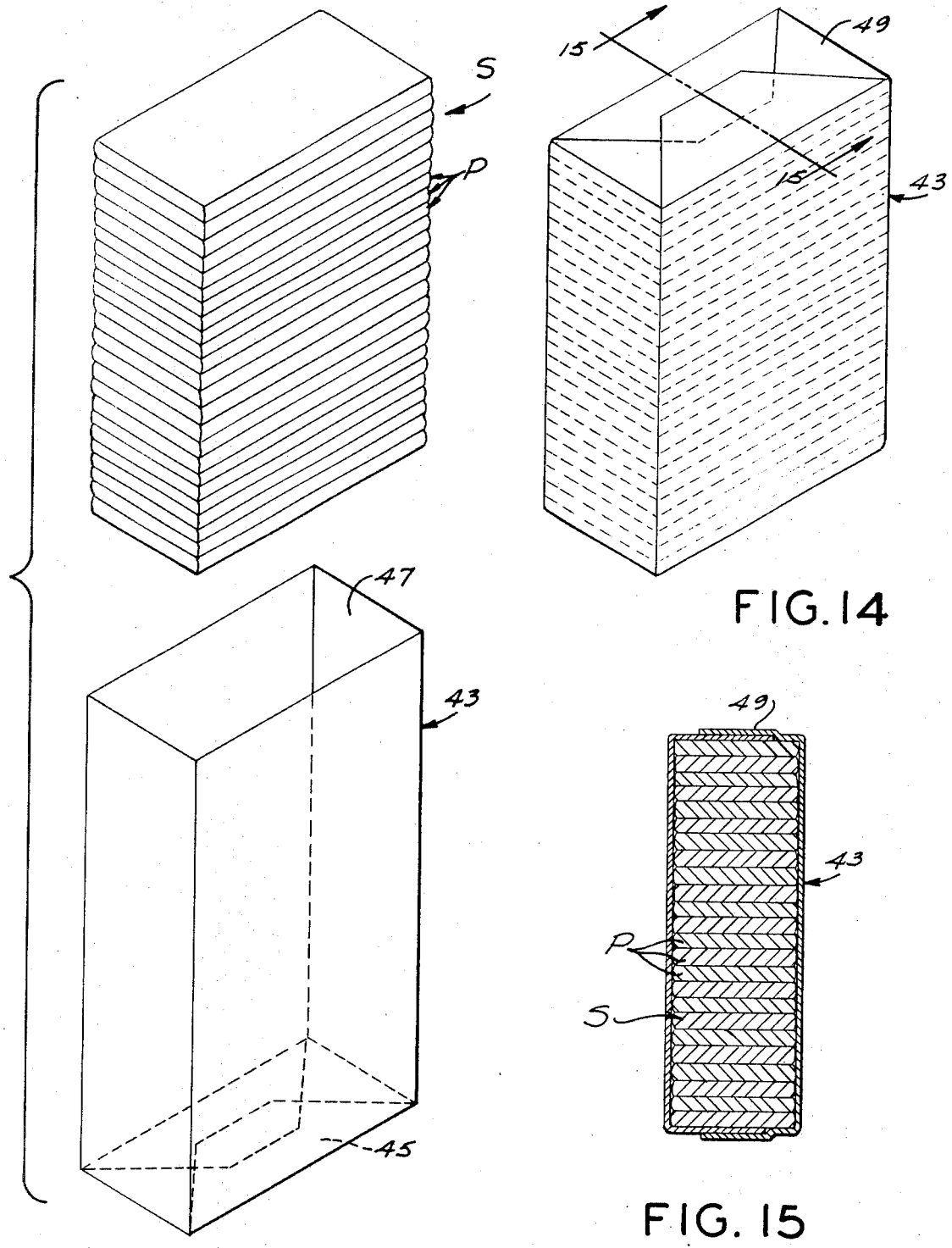
FIG. 13 is a view showing the insertion of a stack of compressed packages in a baler bag.
FIG. 14 is a view showing the stack bound in the baler bag.
FIG. 15 is a section on line 15—15 of FIG. 14.

FIGS. 13–15 illustrate still another version of enwrapping or binding, involving insertion of a stack S of compressed packages in a paper baler bag 43, and closure of the baler bag, to enwrap the stack. The latter is supplied with a bottom closure 45 such as a pasted bottom and an open mouth 47. The stack S is inserted endwise in the baler so that one end of the stack engages the bottom closure 45 (i.e., the face of the package at that end of the stack engages the bottom closure of the baler). The baler has a length greater than the height of the stack so that its upper end portion projecting upward above the stack may be formed into a pasted end closure 49 (see FIGS. 14 and 15) engaging the other end of the stack (i.e., the face of the package at said other end of the stack). The baler then serves effectively to confine the compressed packages against expansion such as would otherwise occur due to re-entry of air to any package, noting that expansion of any package is lengthwise of the baler, and the baler is strongly adapted to resist forces of expansion against its ends. Distortion of the baler due to expansion tends to be confined to the ends of the baler, which are generally small in relation to its four sides, and this provides a squarer package than one in which ends of the stack engage two opposite sides of the baler, rather than engaging its ends, as to which expansion against these two opposite sides would bulge out larger areas. In this regard, it is desirable that the height of the stack be appreciably greater than its greatest widthwise dimension (i.e., be appreciably greater than the length of a single compressed package) and that the baler be dimensioned accordingly, as shown in FIGS. 13–15, so that the ends of the baler are small in relation to the sides of the baler. In the event of expansion of one or more packages in the baler, the expansion is then against the two smallest surfaces of the baler, rather than against larger surfaces of the baler, and this minimizes deformation of the baler out of rectangular parallelepiped form. While the ends of the baler may bulge out to some extent, their bulging out is minimized since they are the smallest of the surfaces of the baler. It is contemplated that stacks of packages may be containerized and confined in cartons, corrugated fiberboard shipping containers, or wrapped in a wrapper of paper or other suitable material, rather than being containerized and confined in a baler.

Reference has been made above to deliberate puncturing of a compressed package or packages in a bound stack for expansion for a snug fit of the stack in the binding. For certain classes of products which it is desired to retain sealed in the packages, it may be undesirable to puncture the packages, yet still be desirable to effect expansion for a snug fit in the binding. This may be taken care of by including a special compressed package in a stack of such packages, which special package may be referred to as an "expansion" package, containing a foam rubber block, for example, which may be punctured for expansion purposes while leaving the other packages intact.

Figure 17:
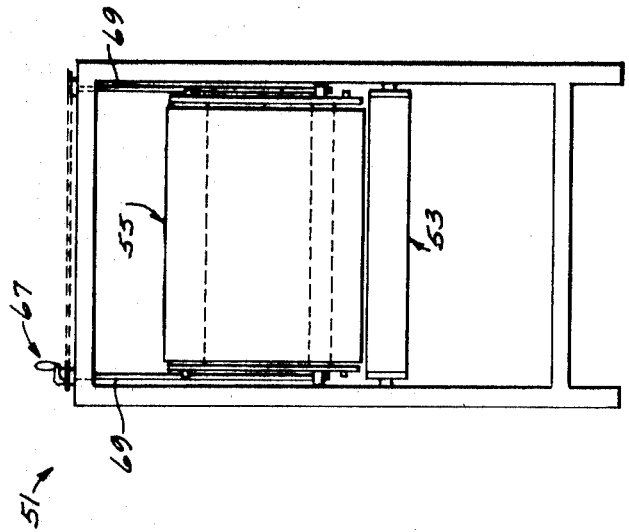
FIGS. 16 and 17 are views showing compression of packages by conveyors.
Figure 16:
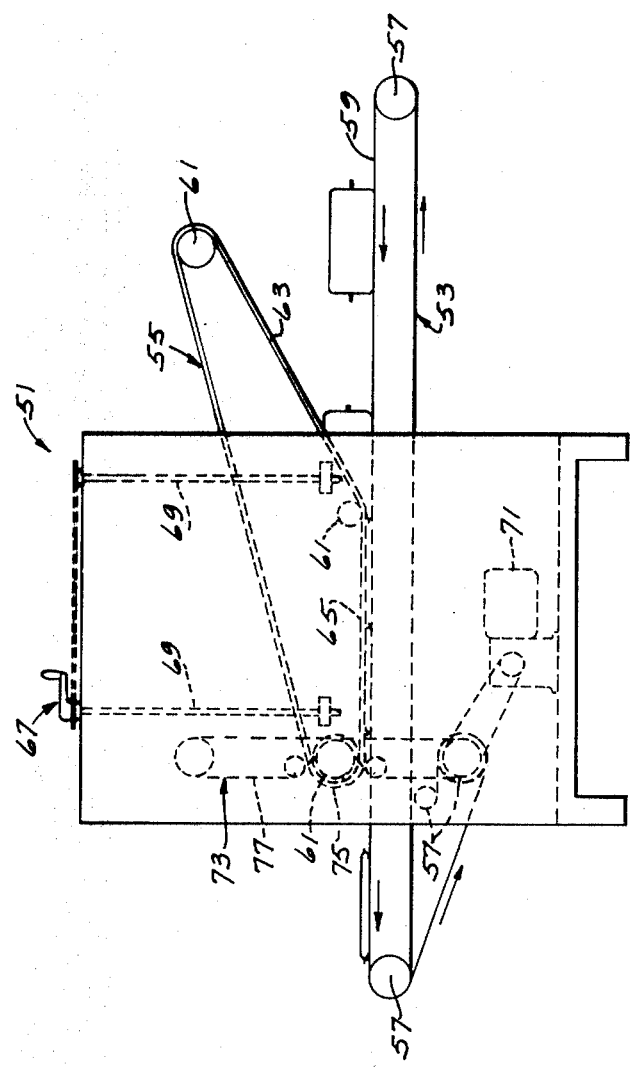

FIGS. 16 and 17 show an alternative mode of compressing the packages, whereby packages may be compressed continuously one after another, rather than one or a few at a time in a press such as shown in FIG. 5. As shown in FIGS. 16 and 17, a conveyor-type press 51 is utilized, this press comprising a pair of endless conveyors 53 and 55 having converging reaches between which sealed bags 1 with the uncompressed products therein are successively and continuously fed forward one after another for compressing the packages. More particularly, conveyor 53 comprises an endless belt trained around rollers 57 to have a generally horizontal upper reach 59. This belt is continuously driven in the direction for movement of its upper reach 59 from right to left as shown in FIG. 16. Conveyor 55, located above conveyor 53, comprises an endless belt, which may be made of foam rubber or the like, trained around rollers 61 to have a lower flight including downwardly inclined trailing reach 63 opposed to a trailing portion of the upper reach 59 of the lower belt 53 and a generally horizontal leading reach 65 opposed to an intermediate portion of the upper reach 59 of the lower belt 53. Reaches 59 and 65 are spaced a distance corresponding to the desired final thickness for the compressed packages. Sealed bags with uncompressed products are fed in on reach 59 between the belts, which constitute opposed pressure-applying surfaces for applying pressure to the sealed bags for compression thereof. The bags are preferably fed forward with their vent valve ends trailing, meaning that the compression is applied starting at the end of each bag opposite its vent valve end and progressing toward its vent valve end, so that air may more readily escape. Means such as indicated at 67 may be provided for turning screws 69 for raising and lowering the upper conveyor 55 to vary the spacing of reaches 59 and 65, and the conveyors are adapted to be driven with the conveyor 55 in any adjusted position by a motor-speed reducer unit 71 via a chain and sprocket drive arrangement 73 including a sprocket 75 on the leading roller 61 which remains in mesh with the chain 77 as conveyor 55 is moved up or down.

Thus, the invention provides a simplified effective mode of producing compressed packages at a rapid rate and at relatively low cost with the packages desirably having the general shape of a rectangular parallelepiped. The bound packages remain in their compressed condition despite re-entry of air. With the binding, the bags used for the compression packaging may be made of less impermeable lower cost material than otherwise. The compressed packages may be warehoused and shipped to their ultimate destination with great savings over the warehousing and shipping of uncompressed packages of corresponding products. For example, a foam pillow may be compressed to one-tenth its original thickness, and the savings in storage space and freight resultant from such reduction in volume of the pillow will be readily apparent. Upon arrival at the ultimate destination, e.g., a retail store, the compressed packages may, if desired, be removed from their binding and punctured or otherwise opened for expansion back to normal size. Since the bag used in the compression packaging is dimensioned to receive the uncompressed product or products, it is possible to open the bag, remove the product or products for close inspection, and then to return the product or products to the bag, as may be desirable, and which is not possible as regards packages made by compressing the product prior to insertion in a bag having the size of the compressed product (rather than having the size of the uncompressed product).

Figure 18:
FIG. 18 is a view of another type of bag which may be used in carrying out the invention.
Figure 18:
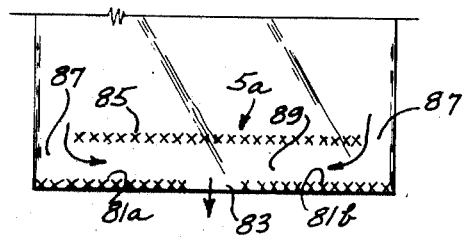

FIG. 18 shows a bag with an alternative self-sealing vent 5a that may be used. This vent 5a is provided by heat-sealing the walls of the bag together by means of seals 81a and 81b on a first line extending transversely of the bag adjacent the end of the bag, each of these seals extending inward from a respective side of the bag toward but terminating short of the center of the bag so as to provide a gap 83 between the inner ends of these seals, and a seal 85 on a second line spaced inward from seals 81a and 81b extending transversely of the bag from a point short of one side of the bag to a point short of the other side of the bag, thus providing gaps 87 between the sides of the bag and the ends of the seal 85. This arrangement is such that air may escape from within the bag via gaps 87 to the channel 89 between the seals 85 and 81a, 81b, and then escape from this channel via the gap 83, as indicated by the arrows in FIG. 18.

In view of the above, it will be seen that the several objects of the invention are achieved and other advantageous results attained.

As various changes could be made in the above methods without departing from the scope of the invention, it is intended that all matter contained in the above description or shown in the accompanying drawings shall be interpreted as illustrative and not in a limiting sense.

What is claimed is:

1. The method of packaging a product which is capable of being compressed to reduce its volume comprising
   inserting the product in a bag made of material which is substantially impervious to air and which has a vent for escape of air from the bag on compression of the bag sealed with the product therein, said vent being a self-sealing vent adapted automatically to close against return of air to the bag on release of compression,
   the product being sealed in the bag, and
   compressing the sealed bag with the product therein between opposed pressure-applying surfaces to reduce the volume of the product, air compressed within the bag escaping via said vent, and the vent then automatically being closed against return of air to the bag thereby to form the bag with the product sealed therein into a compressed package, wherein the bag is a sealable plastic bag having a mouth at one end, the product being inserted in the bag via the mouth, the mouth being sealed after insertion of the product and before the compression.

2. The method of claim 1 wherein the vent is adapted to vent air from the bag at its end opposite the mouth, and wherein the sealed bag with the product therein is compressed flatwise only in face-to-face direction in respect to the bag.

3. The method of claim 1 wherein the bag is compressed between two pressure-applying resilient yieldable surfaces for forcing the bag into conformance with the compressed product.

4. The method of claim 1 wherein compression is applied by feeding the bag between converging reaches of a pair of endless conveyors.

5. The method of claim 1 further comprising the step of stacking a plurality of the packages and applying a substantially inexpansible wrapper to the stack to bind it against expansion by air entering any package.

6. The method of claim 5 further comprising the step of puncturing at least one package in the stack for admitting air thereto so that it tends to expand for snugness of the stack in the wrapper.

7. The method of packaging a product which is capable of being compressed to reduce its volume comprising inserting the product in a bag made of material which is substantially impervious to air and which has a vent for escape of air from the bag, the product being sealed in the bag, and compressing the sealed bag with the product therein between opposed pressure-applying surfaces to reduce the volume of the product, air compressed within the bag escaping via said vent, and the vent then being closed against return of air to the bag thereby to form the bag with the product sealed therein into a compressed package, wherein the bag is a heat-sealable plastic bag having a mouth at one end, the product being inserted in the bag via the mouth, the mouth being heat-sealed after insertion of the product and before the compression, and the vent being a self-sealing vent adapted automatically to close against return of air upon release of compression wherein the vent is adapted to vent air from the bag at its end opposite the mouth, and wherein the sealed bag with the product therein is compressed flatwise only in face-to-face direction in respect to the bag, further comprising the step of stacking a plurality of the packages and applying a substantially inexpansible wrapper to the stack to bind it against expansion by air entering any package, and further comprising the step of puncturing at least one package in the stack for admitting air thereto so that it tends to expand for snugness of the stack in the wrapper, and wherein said one punctured package contains a product different from that in other packages, said other packages remaining sealed.

References Cited

UNITED STATES PATENTS

| | | | |
|---|---|---|---|
| 2,530,400 | 11/1950 | Rado | 53—28 |
| 2,979,871 | 4/1961 | Kieckhefer | 53—24 X |
| 3,196,587 | 7/1965 | Hayward | 53—25 |
| 3,246,443 | 4/1966 | Slemmons | 53—24 |
| 3,254,828 | 6/1966 | Lerner | 93—35 |
| 3,292,626 | 12/1966 | Schneider | 229—62.5X |
| 3,319,394 | 5/1967 | Talalay | 53—24 |
| 3,330,088 | 7/1967 | Dunlea | 53—24 |
| 3,362,128 | 1/1968 | James | 53—24 |
| 3,382,643 | 5/1968 | Hullhorst | 53—24 |
| 3,401,867 | 9/1968 | Long | 229—62.5 |
| 3,315,435 | 4/1967 | Gunyou | 53—24 |
| 3,407,562 | 10/1968 | Di Nicola | 53—24 |
| 3,113,874 | 12/1963 | Bansh. | |
| 3,343,331 | 9/1967 | French. | |
| 3,439,469 | 4/1969 | Van Mil. | |
| 3,471,990 | 10/1969 | Bonughi. | |

FOREIGN PATENTS

| | | |
|---|---|---|
| 1,395,509 | 3/1965 | France. |

WAYNE A. MORSE, JR., Primary Examiner

U.S. Cl. X.R.

53—37, 124; 93—8, 35; 229—62.5